United States Patent
Valpola et al.

(10) Patent No.: US 9,050,719 B2
(45) Date of Patent: Jun. 9, 2015

(54) METHOD FOR THE SELECTION OF PHYSICAL OBJECTS IN A ROBOT SYSTEM

(75) Inventors: Harri Valpola, Helsinki (FI); Tuomas Lukka, Helsinki (FI)

(73) Assignee: ZENROBOTICS OY, Helsinki (FI)

( * ) Notice: Subject to any disclaimer, the term of this patent is extended or adjusted under 35 U.S.C. 154(b) by 91 days.

(21) Appl. No.: 13/806,426

(22) PCT Filed: May 5, 2011

(86) PCT No.: PCT/FI2011/050414
§ 371 (c)(1),
(2), (4) Date: Jan. 31, 2013

(87) PCT Pub. No.: WO2011/161304
PCT Pub. Date: Dec. 29, 2011

(65) Prior Publication Data
US 2013/0151007 A1    Jun. 13, 2013

(30) Foreign Application Priority Data

Jun. 24, 2010 (FI) .................................. 20105732

(51) Int. Cl.
*B25J 9/00* (2006.01)
*B25J 9/16* (2006.01)
*B25J 13/08* (2006.01)

(52) U.S. Cl.
CPC *B25J 9/00* (2013.01); *B25J 9/1697* (2013.01); *B25J 9/1694* (2013.01); *B25J 13/085* (2013.01);
(Continued)

(58) Field of Classification Search
CPC ........... G05B 2219/39543; G05B 2219/40053; G05B 2219/40609; G05B 2219/40583; B25J 9/1697; B25J 9/1694

USPC ......................................... 700/245, 258, 259
See application file for complete search history.

(56) References Cited

U.S. PATENT DOCUMENTS 3,896,940 A * 7/1975 Birrell ........................... 414/797
4,305,130 A * 12/1981 Kelley et al. .................. 700/259
(Continued)

FOREIGN PATENT DOCUMENTS

| CN | 101618444 A | 1/2010 | |
| DE | 10319253 A1 * | 12/2004 | B25J 9/22 |

(Continued)

OTHER PUBLICATIONS

Cort, Adam, "Robotic parts feeding," Assembly, Jun. 2007, pp. 50-54.*

(Continued)

*Primary Examiner* — Behrang Badii
*Assistant Examiner* — David Testardi
(74) *Attorney, Agent, or Firm* — Lowe Hauptman & Ham, LLP

(57) ABSTRACT

A method in which an apparatus receives first sensor data from first sensors and determines a target position from the data, the target position may be a position in space or an orientation of a gripper in a robot arm First instructions are issued to the robot arm or the gripper in order to move a gripper to the target position. Force feedback sensor data is received from force feedback sensors associated with either the robot arm or the gripper or from the first sensors. A failure in carrying out the first instructions is determined. Second sensor data is received from the at least one first sensor. Successful gripping of an object is determined from the second sensor data.

14 Claims, 3 Drawing Sheets

(52) U.S. Cl.
CPC ............... *B25J 13/08* (2013.01); *Y10S 901/09* (2013.01); *G05B 2219/39528* (2013.01); *G05B 2219/40053* (2013.01); *G05B 2219/40571* (2013.01)

(56) References Cited

U.S. PATENT DOCUMENTS

| | | | |
|---|---|---|---|
| 4,835,730 A * | 5/1989 | Shimano et al. | 700/257 |
| 5,299,693 A | 4/1994 | Ubaldi et al. | |
| 6,056,108 A * | 5/2000 | Buchi et al. | 198/395 |
| 7,415,321 B2 * | 8/2008 | Okazaki et al. | 700/245 |
| 7,957,580 B2 * | 6/2011 | Ban et al. | 382/153 |
| 7,966,094 B2 * | 6/2011 | Ban et al. | 700/260 |
| 7,996,114 B2 * | 8/2011 | Ban et al. | 700/259 |
| 8,098,928 B2 * | 1/2012 | Ban et al. | 382/153 |
| 8,380,342 B2 * | 2/2013 | Ban et al. | 700/218 |
| 8,606,398 B2 * | 12/2013 | Eakins et al. | 700/245 |
| 2002/0193909 A1 | 12/2002 | Parker et al. | |
| 2007/0187299 A1 | 8/2007 | Valerio | |
| 2007/0213874 A1 * | 9/2007 | Oumi et al. | 700/245 |
| 2007/0276539 A1 * | 11/2007 | Habibi et al. | 700/245 |
| 2009/0025502 A1 * | 1/2009 | Nakamoto | 74/490.01 |
| 2010/0004778 A1 | 1/2010 | Arimatsu | |
| 2011/0223000 A1 * | 9/2011 | Martinez et al. | 414/730 |
| 2011/0223001 A1 * | 9/2011 | Martinez et al. | 414/730 |
| 2012/0165986 A1 * | 6/2012 | Fuhlbrigge et al. | 700/259 |

FOREIGN PATENT DOCUMENTS

| | | | |
|---|---|---|---|
| EP | 1522911 | 4/2005 | |
| EP | 1589483 A2 | 10/2005 | |
| EP | 2221152 A1 * | 8/2010 | B25J 9/16 |
| GB | 2229809 | 10/1990 | |
| JP | 2000263481 A * | 9/2000 | B25J 13/08 |
| JP | 2002267599 A | 9/2002 | |
| JP | 2003-211096 | 7/2003 | |
| JP | 2004-86799 | 3/2004 | |
| JP | 2004160594 A | 6/2004 | |

OTHER PUBLICATIONS

EPO machine translation of DE 10319253 (original DE document published Dec. 2, 2004).*
JPO machine translation of JP 2000-263481 (original JP document published Sep. 26, 2000).*
International Search Report mailed Sep. 2, 2011 for PCT/FI2011/050414.
International Preliminary Report on Patentability by the International Bureau of WIPO issued Dec. 28, 2012 for PCT/FI2011/050414.
European Search Report dated Mar. 19, 2014.

* cited by examiner

METHOD FOR THE SELECTION OF PHYSICAL OBJECTS IN A ROBOT SYSTEM

CROSS REFERENCE TO RELATED APPLICATION

This application claims the priority of Finnish Patent Application No. 20105732, filed on Jun. 24, 2010 in the PRH (Finnish Patent and Registration Office). Further, this application is the National Phase application of International Application No. PCT/FI2011/050414 filed May 5, 2011, which designates the United States and was published in English.

BACKGROUND OF THE INVENTION

1. Field of the Invention

The present invention relates to systems and methods used for manipulating physical objects. In particular, the present invention relates to a method for the selection of physical objects in a robot system.

2. Description of the Related Art

Robot systems have widely been used in many industries to perform repetitive tasks that require little capability to actually model visually or cognitively physical objects being manipulated or that require little skill to take a hold on and to move. Robots can also be built to work in environments hostile to human floor workers or to be able to work with material hazardous to humans such as toxic or radioactive materials, waste or massive objects. It is desirable to make such robot systems as autonomous as possible to minimize the amount of human involvement needed.

When the aim is to have the robot arm to manipulate objects, the robot arm is commonly equipped with a device suitable for gripping the objects of interest. Such a device can, for example, resemble a hand, a claw or a clamp. While programming the robot to perform repetitive tasks is relatively easy, there are difficult problems in automatically manipulating objects, especially related to recognizing the objects from a varying environment or an environment crowded with other objects, and manipulating an object which resides among other objects. Namely, other objects may cover the object partially or in whole, thus making it difficult to pin down the exact location of the object to instruct the robot arm to move to, or the other objects can obstruct the movements of a robot hand thereby making pre-programmed movements unsuitable for the task.

The problem of recognizing objects is commonly dealt with using pattern recognition algorithms, which search for objects in sensory data such as digital camera images. Such algorithms are an actively studied field. While there are many algorithms which can even recognize objects against an uneven background, pattern recognition algorithms generally work best when the background is both uniform and predetermined. Previously, objects of predetermined type have been searched from a clear operating area and they been selected from the operating area as recognized objects. Sets of actions can be performed on a selected object of a known type. The set of actions can be chosen based on the type of the object, for example placing different kinds of objects in different bins.

However, there are possibilities for error in determining of the type of an object. For example, image recognition algorithms can produce false results, identifying an object as that of a wrong type. Further, even if the object has been correctly recognized, the gripper could fail to grip the intended object, for example, if the intended object is obscured by another object which could get gripped instead, or if the gripper is not moved to the right position before gripping as a result of inaccuracies in controlling the robot arm. There is also the possibility that several objects are inadvertently gripped at the same time, for example, if the objects are located close together or they are stuck together. In applications such as recycling and waste management, it is important that the purity of a sorted group of objects is high, namely, that as few as possible objects of a wrong type end up in the sorted groups of objects.

SUMMARY OF THE INVENTION

The invention relates a method comprising: receiving first sensor data from at least one first sensor; determining a target position from the first sensor data, said target position comprising at least one of a position in space and an orientation for a gripper in association with a robot arm; starting to issue at least one first instruction to at least one of the robot arm and the gripper in order to move the gripper to the target position; receiving force feedback sensor data from at least one of the at least one first sensor and at least one force feedback sensor, associated with at least one of the robot arm and the gripper, to determine a failure in carrying out the at least one instruction; receiving second sensor data from the at least one first sensor; determining a successful gripping of an object from the second sensor data; receiving verification sensor data from at least one second sensor, in response to the determining of the successful gripping; and issuing at least one second instruction to the robot arm in order to move the arm to a predetermined position to release the grip of the gripper.

The invention relates also to an apparatus, comprising: means for receiving first sensor data from at least one first sensor; means for determining a target position from the first sensor data, said target position comprising at least one of a position in space and an orientation for a gripper in association with a robot arm; means for starting to issue at least one first instruction to at least one of the robot arm and the gripper in order to move the gripper to the target position; means for receiving force feedback sensor data from at least one of the at least one first sensor and at least one force feedback sensor, associated with at least one of the robot arm and the gripper, to determine a failure in carrying out the at least one instruction; means for receiving second sensor data from the at least one first sensor; means for determining a successful gripping of an object from the second sensor data; means for receiving verification sensor data from at least one second sensor, in response to the determining of the successful gripping; and means for issuing at least one second instruction to the robot arm in order to move the arm to a predetermined position to release the grip of the gripper.

The invention relates also to a computer program embodied on a computer readable medium, the computer program comprising code for controlling a processor to execute a method comprising: receiving first sensor data from at least one first sensor; determining a target position from the first sensor data, said target position comprising at least one of a position in space and an orientation for a gripper in association with a robot arm; starting to issue at least one first instruction to at least one of the robot arm and the gripper in order to move the gripper to the target position; receiving force feedback sensor data from at least one of the at least one first sensor and at least one force feedback sensor, associated with at least one of the robot arm and the gripper, to determine a failure in carrying out the at least one instruction; receiving second sensor data from the at least one first sensor; determining a successful gripping of an object from the second sensor data; receiving verification sensor data from at least one second sensor, in response to the determining of the successful gripping; and issuing at least one second instruction to the robot arm in order to move the arm to a predetermined position to release the grip of the gripper.

The invention relates also to a method comprising receiving first sensor data from at least one first sensor; determining a target position from the first sensor data, said target position comprising at least one of a position in space and an orientation for a gripper in association with a robot arm; starting to issue at least one first instruction to at least one of the robot arm and the gripper in order to move the gripper to the target position; receiving force feedback sensor data from the at least one first sensor or at least one force feedback sensor, associated with at least one of the robot arm and the gripper, to determine a failure in carrying out the at least one instruction; receiving second sensor data from the at least one first sensor; determining a successful gripping of an object from the second sensor data; receiving verification sensor data from at least one second sensor, in response to the determining of the successful gripping; and issuing at least one second instruction to the robot arm in order to move the arm to a predetermined position to release the grip of the gripper.

The invention relates also to an apparatus, comprising: means for receiving first sensor data from at least one first sensor; means for determining a target position from the first sensor data, said target position comprising at least one of a position in space and an orientation for a gripper in association with a robot arm; means for starting to issue at least one first instruction to at least one of the robot arm and the gripper in order to move the gripper to the target position; means for receiving force feedback sensor data from the at least one first sensor or at least one force feedback sensor, associated with at least one of the robot arm and the gripper, to determine a failure in carrying out the at least one instruction; means for receiving second sensor data from the at least one first sensor; means for determining a successful gripping of an object from the second sensor data; means for receiving verification sensor data from at least one second sensor, in response to the determining of the successful gripping; and means for issuing at least one second instruction to the robot arm in order to move the arm to a predetermined position to release the grip of the gripper.

The invention relates also to a computer program embodied on a computer readable medium, the computer program comprising code for controlling a processor to execute a method comprising: receiving first sensor data from at least one first sensor; determining a target position from the first sensor data, said target position comprising at least one of a position in space and an orientation for a gripper in association with a robot arm; starting to issue at least one first instruction to at least one of the robot arm and the gripper in order to move the gripper to the target position; receiving force feedback sensor data from the at least one first sensor or at least one force feedback sensor, associated with at least one of the robot arm and the gripper, to determine a failure in carrying out the at least one instruction; receiving second sensor data from the at least one first sensor; determining a successful gripping of an object from the second sensor data; receiving verification sensor data from at least one second sensor, in response to the determining of the successful gripping; and issuing at least one second instruction to the robot arm in order to move the arm to a predetermined position to release the grip of the gripper.

The invention relates also to an apparatus comprising a memory and at least one processor configured to receive first sensor data from at least one first sensor, to determine a target position from the first sensor data, said target position comprising at least one of a position in space and an orientation for a gripper in association with a robot arm, to start to issue at least one first instruction to at least one of the robot arm and the gripper in order to move the gripper to the target position, to receive force feedback sensor data from at least one of the at least one first sensor and at least one force feedback sensor, associated with at least one of the robot arm and the gripper, in order to determine a failure in carrying out the at least one instruction, to receive second sensor data from the at least one first sensor, to determine a successful gripping of an object from the second sensor data, to receive verification sensor data from at least one second sensor, in response to the determining of the successful gripping, and to issue at least one second instruction to the robot arm in order to move the arm to a predetermined position to release the grip of the gripper.

In one embodiment of the invention, the at least one instruction comprises a signal indicating at least one move for the robot arm and/or the gripper. In one embodiment of the invention, the at least one instruction is a simple driving voltage applied for controlling at least one of rotation, elevation and gripping.

In one embodiment of the invention, a first learning entity within the apparatus registers the successful gripping and the first sensor data.

In one embodiment of the invention, a first learning entity within the apparatus registers an unsuccessful gripping and the first sensor data, in response to a determined failure in carrying out at least one of the at least one instruction.

In one embodiment of the invention, an arm movement control entity or the first learning entity within the apparatus predicts likelihood for the successful gripping from the first sensor data using the information registered in the first learning entity. The arm movement control entity issues the at least one first instruction to the robot arm in response to the likelihood.

In one embodiment of the invention, the arm movement control entity issues at least one third instruction to the robot arm to move the gripper to a verification position.

In one embodiment of the invention, the verification position corresponds to a verification environment where the at least one second sensor provide may be applied to the object without interfering objects. In one embodiment of the invention, the verification environment has a constant background.

In one embodiment of the invention, the apparatus is configured to determine a type of the object from the verification sensor data from the at least one second sensor.

In one embodiment of the invention, the step of starting to issue the at least one first instruction to the robot arm or the method generally further comprises: providing first coordinates to the robot arm; receiving first intermediate sensor data from the at least one first sensor; and determining an actual position of the gripper in a sensor coordinate system using the first intermediate sensor data. These steps may be carried out by the arm movement control entity within the apparatus.

In one embodiment of the invention, the step of starting to issue the at least one first instruction to the robot arm or the method generally further comprises: determining an error between the actual position of the gripper and the first coordinates; providing second coordinates to the robot arm; receiving second intermediate sensor data from the at least one first sensor; determining a second actual position of the gripper in a sensor coordinate system using the second intermediate sensor data; and checking whether the error is smaller than a predetermined threshold. If the error is larger than the threshold the method may continue with the steps of determining the error again, providing the second coordinates, receiving second intermediate sensor data and determining the second actual position.

In one embodiment of the invention, the step of starting to issue the at least one first instruction to the robot arm or the method generally further comprises: registering an association between coordinates of the robot arm and the position of the gripper as determined in the sensor coordinate system in a second learning entity.

In one embodiment of the invention, the step of starting to issue the at least one first instruction to the robot arm or the method generally further comprises: constructing a conversion function between coordinates of the robot arm and coordinates in the sensor coordinates system, using the association registered.

In one embodiment of the invention, the step of determining a target position from the first sensor data further comprises: determining an initial target position in the sensor coordinate system; and computing the target position from the initial target position using the conversion function.

In one embodiment of the invention, the conversion function is a conversion matrix computed using at least the association registered between coordinates of the robot arm and the position of the gripper as determined in the sensor coordinate system. Similarly, other similar associations may be used to compute the conversion matrix.

In one embodiment of the invention, the object of interest is located in an unstructured arena, that is, an environment or generally a three-dimensional space, which is not predetermined in one or several of its characteristics, such as background color or geometry, and which can include, in addition to the objects of interest, other objects of unknown characteristics. For example, a pile of trash could constitute an unstructured arena, that is, an operating space of a robot. An unstructured arena can also change as time progresses. For example, as pieces of trash are removed from the pile, the pieces of trash can shuffle, move or collapse. New trash can also get added to the pile.

In one embodiment of the invention, the invention includes a robot arm controlled by a controlling unit and installed so that it can reach objects which reside in an unstructured arena.

In one embodiment of the invention, the system furthermore includes a gripper attached to the robot arm and controlled by the controlling unit. The gripper can, for example, be a device which grips objects by enclosing them, in a way resembling a hand or a claw.

In one embodiment of the invention, the system furthermore includes at least one sensor device which can be used to produce sensory data about the unstructured arena. One such sensor device can be, for example, a digital camera oriented to view the unstructured arena.

In one embodiment of the invention, the gripper includes sensors which can be used to measure whether the gripper is in contact with objects in the unstructured arena, for example when the gripper is moved and it collides against an object, or when an object is gripped.

In one embodiment of the invention, the system furthermore includes a predetermined verification position for the robot arm, located and oriented in such way that the robot arm, gripping an object, can be moved and oriented in such way that at least one sensor can then view the object against this arena. Such arena can, for example, comprise a flat surface of known and constant color, such that the gripped object can be placed by the robot in this background and thus more accurately viewed by sensors, or it can consist of other kind of setup suitable for verification of the object type by the sensors used.

In one embodiment of the invention, the system includes a first learning system configured to receive data from the sensors and to output a location in the unstructured arena, where the likelihood of a successful gripping operation is suitably high, to the controller unit.

In one embodiment of the invention, the system includes a second learning system configured to receive data from the sensors and output the likelihood that a gripping operation performed at this location will result in gripping an object of desired type.

In one embodiment of the invention, the controller unit is configured to move the robot arm so that the gripper is located at a previously determined location in the unstructured arena, and then to grip an object at this location.

In one embodiment of the invention, the success of the gripping operation is then determined using data from sensors. If the grip is not successful, the robot arm is then moved to different location for another attempt. Upon a successful gripping operation the controller unit is configured to then move the object to a predefined verification position, and the type of the object is determined by performing a verification operation. The verification operation receives as its input sensor data and outputs the determined type of the object.

In one embodiment of the invention, the system is further improved by utilizing learning systems, which may run in the apparatus.

In one embodiment of the invention, there is a learning system, which may be referred to as a first learning system or a first learning entity. For each gripping attempt, the sensor data preceding the movement of the arm and the result of the evaluation of the gripping operation are applied to the first learning system. The first learning system is configured to calculate a location in the unstructured arena where a successful gripping operation is likely, thus improving the operation of the system as new attempts at gripping objects are made.

In one embodiment of the invention, there is a learning system, which may be referred to as a second learning system or a second learning entity. The sensor data preceding the movement of the arm and position and orientation of the robot arm before and after the moving of the robot arm are also applied to the second learning system, which is configured to calculate an efficient way to move the robot arm to the determined target location, thus speeding up the operation of the robot system as new movements of the robot arm are made.

In one embodiment of the invention, the computer program is stored on a computer readable medium. The computer readable medium may be a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a system, an apparatus, a computer program or a computer program product to which the invention is related may comprise at least one of the embodiments of the invention described hereinbefore.

The benefits of the invention are related to improved quality in the selection of objects from an operating space of a robot.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
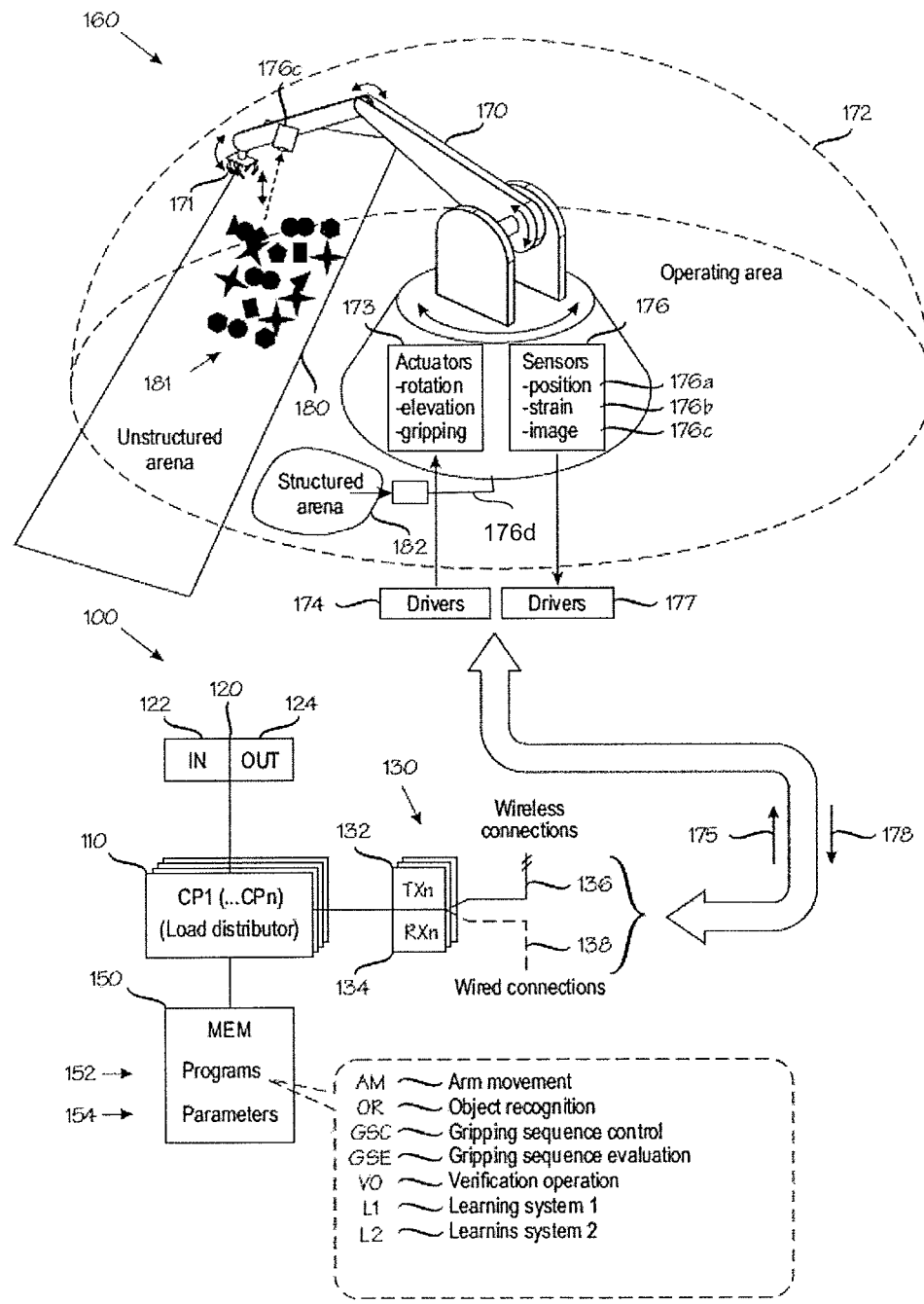
FIG. 1 is a block diagram illustrating a robot system for the selection of physical objects in one embodiment of the invention.

FIG. 1 is a block diagram illustrating a robot system for the selection of physical objects in one embodiment of the invention. In FIG. 1 a data processing apparatus 100, in short an apparatus, comprises a central processing unit (CP) 110 and memory 150. Some embodiments of the invention employ multiple processors CP1 through CPn, plus a load distribution unit for distributing load among the multiple processors. The one or more processors control the robot arm by executing programs 152 stored in one or more memories 150. During execution, the programs 152 set up and update various parameters and variables 154 in the memory 150. Some parameters may be represented, for example, as tables, arrays, lists, sparse or dense matrixes or other data structures.

In addition, the data processing apparatus 100 comprises or utilizes external input-output circuitry 120 which constitutes a user interface of the data processing apparatus. The input-output circuitry 120 comprises an input circuitry 122 and an output circuitry 124. A keyboard interface and a display interface are illustrative but non-restrictive examples of such input circuitry 122 and an output circuitry 124.

In order to communicate with external devices, the data processing apparatus 100 typically comprises or utilizes external reception/transmission circuitry 130 which comprises a transmission circuitry ("TXn") 132, reception circuitry ("RXn") 134 and an internal or external antenna 136. The suffix "n" in connection with the TXn and RXn indicates that the data processing apparatus may utilize several different interfacing technologies for communicating with the physical world, which in the present example includes the robot arm and, optionally, a separate verification environment.

Wireless local-area networks (WLAN) and short-range wireless interfaces, such as infrared, radio or Bluetooth, are illustrative but non-restrictive examples of such wireless reception/transmission circuitry. Instead of such wireless communication technologies or in addition to them, the data processing apparatus may utilize wired connections 138, such as a USB (Universal Serial Bus), any parallel or serial interface, or other types of industry-standard interfaces or proprietary interfaces. At the preceding level of generalization, all elements 110 through 138 can be conventional as used in the relevant art.

In addition to the conventional sections, the memory 150 of the data processing apparatus 100 contains a collection of programs 152 for implementing the inventive user entry method. The programs 152 utilize various data structures, variables and parameters, collectively denoted by reference numeral 154.

Reference numeral 160 generally denotes a robot system from which at least some portions are controlled by the data processing apparatus 100. The robot system 160 comprises at least one robot, denoted by reference numeral 170, but it can comprise additional robots, one or more conveyors, such as conveyor belts, stationary sensors, illumination devices, analyzers, or the like. In the present example, the robot 170 is shown in a schematic illustration which resembles an arm with rotating members, but other types of implementations are equally possible. As shown in FIG. 1, the robot arm 170 comprises a gripper 171 which is somewhat analogous to a hand or claw. The robot arm 170 is capable of moving the gripper 171 within an operating area 172. Various movements of the robot arm 170 and gripper 171 are effected by actuators, collectively denoted by reference numeral 173. By way of example, the actuators can be electric, pneumatic or hydraulic, or any combination of these. The actuators may move or rotate various elements of the robot arm 170, as indicated by the straight and curved double-headed arrows in FIG. 1.

The operating area 172 of the robot includes a portion called unstructured arena 180. The unstructured arena 180 comprises various objects, collectively denoted by reference numeral 181. In an illustrative but non-restrictive example, the unstructured arena 180 is a conveyor belt, or the portion of the conveyor belt that intersects the robot's operating area 172. The data processing apparatus has little or no a priori information on the objects 181 within the unstructured arena 180, such as the size, shape and/or color of the objects of interest. In some embodiments of the invention, the data processing apparatus 100 may have some a priori information on the objects of interest, or it may have gained information on the objects by learning, but at least the background (other objects), the position and orientation of the objects of interest are typically unknown a priori. That is, the objects 181 may be in random positions and orientations in the unstructured arena 180, and the objects 181 may overlap each other. Therefore, it is beneficial to dedicate a portion of the robot's operating area 172 to a structured arena 182, in which the gripper 171 can be observed the gripper 171 and any objects gripped by it under relatively constant conditions and against a known background. As used herein, the term relatively constant conditions and background mean that any changes in the structured arena 182 occur so slowly that they can be compensated for by making and storing periodic observations of it.

In one embodiment of the invention, structured arena 182 may also be inspected using at least one second sensor among sensors 176 or using sensor device 176d separated from the first sensor, as the second sensor, which is applicable particularly in structured arena 182. Structured arena may simply be a specific position of robot arm 170 and/or gripper 171, which enables the at least one second sensor to be used without disturbing elements of unstructured arena 181. Separate verification may involve inspecting or analyzing the contents of the gripper with additional equipment, that is, the at least one second sensor 176d. An illustrative but non-exhaustive list of such additional equipment includes 1) an additional imaging device which observes the gripper contents from a different direction and/or at different wavelengths and/or at higher resolution than the collocated camera does; 2) an additional illumination device which illuminates or irradiates the contents of the gripper at different wavelengths and/or energy levels from those present in the unstructured arena; 3) a gas analyzer; and 4) a laser scanner.

A set of electrical drivers 174 converts data processing signals, in other words, instructions from the data processing apparatus 100 to appropriate voltage and power levels for controlling the actuators. In response to control signals 175 from the data processing apparatus 100, the actuators perform various mechanical functions including but not necessarily limited to: positioning the gripper 171 over a specific location within the operating area 172, lowering or raising the gripper, and closing and opening of the gripper. In some embodiments the actuators comprise an actuator for tilting the gripper 171 and the collocated camera 176c such that the camera monitors the gripper against a known background. Thus in such embodiments a structured arena 182 can be implemented by tilting the gripper 171 and camera 176c, and no movement to a different position is needed.

The data processing apparatus 100 may utilize wireless connections via interface 136 and/or wired connections via interface 138 in order to communicate with the robot system 160.

The robot system 160 in general and the robot 170 in particular comprise various sensors, collectively denoted by reference numeral 176. By way of example, the sensors 176 comprise various position sensors 176a which indicate the position of the robot arm 170 and gripper 171, as well as the open/close status of the gripper 171. The open/close status of the gripper is not restricted to a simple yes/no bit. In one embodiment of the invention, the gripper 171 may indicate a multi-bit open/close status in respect of each of its fingers, whereby an indication of the size and/or shape of the object(s) in the gripper may be obtained.

In addition to the position sensors, the set of sensors may comprise strain sensors 176b, also known as strain gauges or force feedback sensors, which indicate strain experienced by various elements of the robot arm 170 and gripper 171. In an illustrative but non-restrictive implementation example, the strain sensors comprise variable resistances whose resistance varies depending on the tension of compression applied to them. Because the changes in resistance are small compared to the absolute value of the resistance, the variable resistances are typically measured in a Wheatstone bridge configuration.

In one embodiment of the invention, the strain sensors 176b act as force feedback sensors which indicate a possible failure of a gripping operation. Failure may be indicated by a force exerted on an outer side of gripper 171, which reveals that the gripper may not be opened to a fully open position on the indicated target location of the arm, or a force in any side that exceeds a preset threshold.

Furthermore the set of sensors may comprise at least one image sensor or camera 176c collocated with the robot arm. In the present context, a collocated camera 176c means that the camera 176c constantly monitors an area under the gripper 171.

Position data signals from the various sensors 176 are converted to appropriate levels and formats by drivers, collectively denoted by reference numeral 177. The converted data signals are transmitted to the data processing apparatus 100 as input signals 178.

The software or set of programs 152 within the memory 150 of the data processing system 100 comprise various programs. As used herein, a "program" means a set of computer program instructions whose execution by one or more processors CP1 ... CPn has the effect that the data processing system 100 instructs the robot system 160 to perform a well-defined high-level operation. An example of a high-level operation is moving the robot arm to a specified position. The corresponding program may utilize various software drivers, routines or dynamic link libraries to convert the high-level operation to a series of low-level operations, such as outputting an appropriate sequence of output signals 175 via the electrical drivers 174 to the actuators 173 of the robot system 160. Alternatively or additionally, some or all of the programs 152 may receive sensor data 178 from the robot system 160 and perform one or more analyzes on the sensor data.

At a minimum, the set of programs 152 comprise programs for arm movement, denoted by reference sign AM, which instructs the robot arm 170 to move to a specified position and, optionally, to tilt the gripper 171 such that its contents can be observed against a known background. The set of programs 152 also comprise a gripping sequence control program GSC and gripping sequence evaluation program GSE. Execution of the gripping sequence control program GSC causes the data processing apparatus 100 to instruct the robot arm 170 and gripper 171 to attempt a gripping operation, which includes approaching, by the gripper 171, a position that includes a candidate object to be gripped, and closing the gripper 171. A partial object of the invention is to provide a method, data processing system and program product capable of determining whether or not the attempted gripping operation was successful. This determination is performed by the gripping sequence evaluation program GSE.

In one particular implementation, the gripping sequence evaluation program GSE utilizes the position sensors 176a and/or the strain sensors 176b of the gripper 171 to determine whether or not the gripper 171 actually gripped something. In other words, the determination may be based on sensing whether or not the gripper becomes fully closed when instructed to do so, or whether the gripper holds something which prevents the gripper from becoming fully closed. The gripping sequence control program GSC may utilize the strain sensors 176b to set an upper limit on the applied gripping force, so as not to damage the gripped object and/or the gripper itself.

In another implementation, the gripping sequence evaluation program GSE may alternatively or additionally utilize the collocated camera 176c to monitor if the camera's field of vision includes something that moves along with the gripper and, consequently, remains essentially constant even if the movement of the gripper changes the background of the view of the camera 176c. For instance, the arm movement program AM may move and/or tilt the gripper 171, the contents of the gripper and the collocated camera 176c to the structured arena 182. The collocated camera may form an image of the gripper and its contents. This current image of the gripper and its contents is then compared with a known, previously-stored image of the gripper. In the comparison, any differences between the current and pre-stored images may be caused by the contents of the gripper, dirt in the gripper or changes in background or illumination. In order to ensure that any differences between the current and pre-stored images reflect actual contents of the gripper, it may be beneficial to periodically update the pre-stored image of the gripper when it is known to be empty, whereby any dirt or changes in background or illumination can be compensated for.

Instead of mechanically sensing whether the gripper becomes fully closed or visually inspecting it, or in addition to such techniques, the robot arm may comprise a strain gauge configured to weigh the gripper 171 and its contents. By subtracting a known net weight of the gripper from its current weight, the weight of the gripper contents can be obtained. This information, either on its own or in combination of the other two pieces of information can contribute to the determination as to whether the gripping operation was successful. All such techniques can be summarized by saying that the success of the gripping operation can be determined by comparing current status information from the gripper with known status information from the gripper. The term "known status information" means that the gripper was known to be empty or its contents were known when the known status information was obtained.

In one embodiment of the invention, programs AM, OR, GSC, GSE, VO, L1 and L2 may be implemented as separate software entities such as, for example, subroutines, processes, threads, modules and program code sequences.

Figure 2:
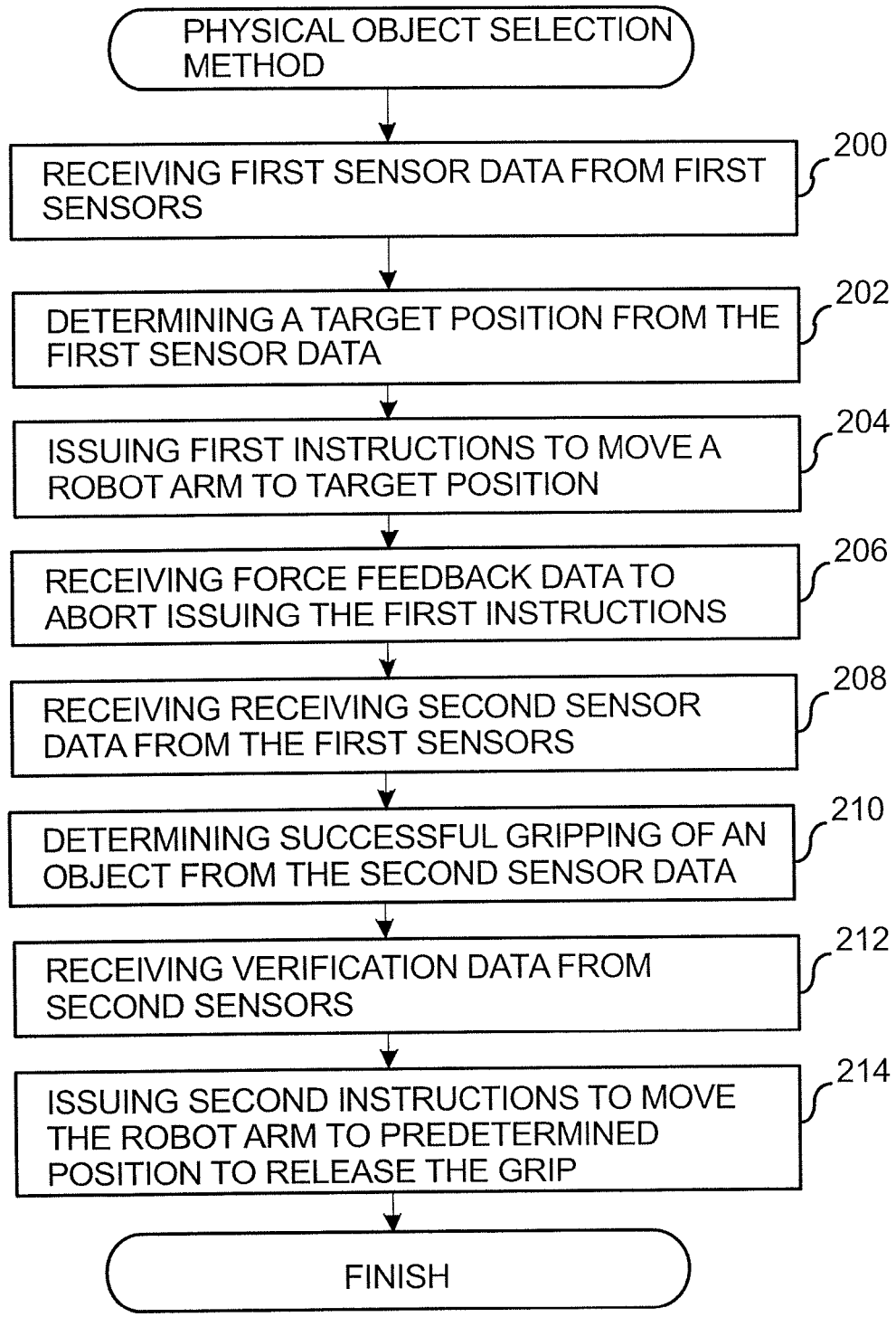
FIG. 2 is flow chart illustrating for the selection of physical objects in a robot system.

FIG. 2 is flow chart illustrating a method for the selection of physical objects in a robot system. The robot system comprises a control apparatus.

At step 200 first sensor data is received from at least one first sensor, which is one of sensors included in the robot system and is separated from the second sensor, to the apparatus. In some embodiments, the first sensor data is first image data acquired by the first sensor.

At step 202 a target position is determined from the first sensor data by the apparatus.

At step 204 the apparatus starts to issue at least one first instruction to a robot arm in order to move a gripper within the robot arm to the target position. The at least one first instruction may be issued in parallel with the step 206 where the apparatus receives force feedback sensor data.

At step 206 the apparatus receives force feedback sensor data from at least one force feedback sensor associated with at least one of the robot arm and the gripper in order to determine a failure in carrying out the at least one instruction.

At step 208 the apparatus receives second sensor data from the at least one first sensor. In some embodiments, the second sensor data is second image data, which is acquired by the first sensor and different from the first image data.

At step 210 the apparatus determines a successful gripping of an object from the second sensor data.

At step 212 the apparatus receives verification sensor data from at least one second sensor, which is one of sensors included in the robot system and is separated from the first sensor, in response to the determining of the successful gripping. In some embodiments, the verification sensor data is third image data acquired by at least one second sensor that is different than the first sensor.

At step 214 the apparatus issues at least one second instruction to the robot arm in order to move the arm to a predetermined position to release the grip of the gripper. Thereupon, the method is finished.

In one embodiment of the invention, a data processing apparatus such as data processing apparatus 100 illustrated in FIG. 1, receives input data from the sensors at least one sensor, for example, a collocated camera. The data processing apparatus extracts a subset of sensor data for object recognition by an object recognition program. The object recognition program is used for extracting from the sensor data features corresponding to objects of interest, said features then forming a data set that is used as the input of a learning system. The present invention allows for virtually any kind of object recognition system to be used, and such system can therefore be well matched to the conditions of the unstructured arena and the specific application of the invention. To help better understand the invention, an example of an object recognition system configured for recognizing red objects by utilizing the collocated camera is now described.

In one embodiment of the invention, input data received from the collocated camera is a digital image which consists of a 2-dimensional array of pixels, each pixel having a numerical value for the red, green and blue color component, hereinafter designated as the R-, G- and B-values, respectively. For the purposes of this example, we now assume that the image produced by the camera includes exactly one object of interest.

The number of pixels in data corresponds to the resolution of the camera. To decrease the amount of computations the image data received from the camera is down-sampled to a resolution determined suitable for analysis. The suitable down-sampling resolution can be determined empirically.

The resulting down-sampled image is then normalized to account for changes in lightning conditions. The normalization may be done separately for each pixel in the down-sampled image. After the normalization, a set of features is calculated from the image, such as the location and orientation of the object of interest, and these features are used as the input for the first learning system. For brevity, only the calculation of the location (x,y) of the object of interest, where x and y are coordinate values in the coordinate system of the image, is now considered as an example of such feature, although the invention is not restricted to only this feature and benefit can be gained from having several different features available to be used as the input for the learning system L1.

In one embodiment of the invention, the calculation of the location (x,y) of the object of interest proceeds in the following manner. First the pixels which correspond to the object of interest in the down-sampled normalized image are determined. Many suitable algorithms for this task are known from literature. In this example, the pixels corresponding to the object are recognized based on the color values, that is, the object is presumed to be red, meaning that red pixels in the image correspond to an object of interest in the image. Once the pixels corresponding to the object of interest have thus been determined, the location (x,y) of the object can be determined by calculating a centroid of the area where the determined pixels are located. Good and free implementations of many suitable algorithms are available, and it is easily achieved for example by using the cvFind-Contours( ) function in the OpenCV Library to determine the set of points (xi, yi) which form a curve enclosing the pixels, and then calculating the mean value of the curve point coordinates, which corresponds to the coordinates of the centroid of the object in the image.

In one embodiment of the invention, when the object recognition program has determined the data set, in this example the location (x,y) of the object of interest, an arm movement program of the data processing apparatus instructs the robot arm to move to a location in world coordinates corresponding to the location (x,y) in image coordinates of the recognized object. To facilitate this arm movement program performs a conversion from the image coordinate system to the world coordinate system, a known method for which is to multiply the coordinate vector (x,y) with a 2×2 conversion matrix M, M having been chosen so that it performs this conversion with an acceptable accuracy and such choice depending on the camera setup. When the robot arm has been moved to the determined location, a gripping sequence control program performs a gripping attempt, which includes instructing the robot arm to lower a gripper to the recognized object and to close the gripper.

In one embodiment of the invention, during the gripping attempt, sensor data from the robot arm, particularly, from the gripper is received by the data processing apparatus. In one embodiment of the invention, the sensor data may indicate that the gripper has collided with an object. More particularly, the sensor data may indicate that the robot arm or gripper fails to move in response to an instruction to move, or that the instruction to move causes an abnormal level of strain in some elements of the robot system, as measured by the strain gauges. In such cases the gripping attempt is aborted. An aborted gripping attempt will be considered a failure in a subsequent evaluation step.

In one embodiment of the invention, after the gripping attempt has been performed, the gripping sequence evaluation program extracts sensor data, particularly sensor data that reflects the contents of the gripper. The success of the gripping attempt is determined from this extracted data. As stated in connection with FIG. 1, the success of the gripping attempt can be determined on the basis of any of the following: 1) an indication that the gripper has closed around an object of a minimum size; 2) a comparison of a current image of the gripper plus contents with a pre-stored image of the gripper with known contents; and 3) the difference between the weight of the gripper plus current contents and the weight of the gripper plus known contents.

In one embodiment of the invention, if the collision detection or any combination of the analysis of the gripper contents indicates that the gripping attempt resulted in a failure, another gripping attempt is performed involving the moving of the robot arm.

In one embodiment of the invention, following a determination of a successful gripping attempt the data processing apparatus instructs the robot arm to perform a set of predetermined operations on the gripped object. Such operations can be chosen to depend on the type of the object, for example if the system is used for sorting different kinds of objects in different bins. Since the location of the object was determined based on the sensor data, the type of the object is known or regarded as known at this point, and the known type can be used for choosing the set of operations to be performed on the object. For instance, in a trash-sorting application, the various object types can correspond to recycling channels: reusable bottles, recyclable plastics, metals, burnable matter, compostable matter, hazardous waste, and so on.

However, at this phase, the type of the object may be determined erroneously. Some more ambitious embodiments of the inventive method comprise a separate verification for additional verification of the type of the object or objects in the gripper. If the gripping attempt was deemed successful, a verification operation program calls the arm movement program such that the robot arm, and particularly the gripper, is instructed to move to a predetermined verifying position. A separate verification is performed in this verifying position. In some implementations the separate verification involves inspecting the contents of the gripper in the structured arena. In other implementations the separate verification may involve inspecting or analyzing the contents of the gripper with additional equipment. An illustrative but non-exhaustive list of such additional equipment includes 1) an additional imaging device which observes the gripper contents from a different direction and/or at different wavelengths and/or at higher resolution than the collocated camera does; 2) an additional illumination device which illuminates or irradiates the contents of the gripper at different wavelengths and/or energy levels from those present in the unstructured arena; 3) a gas analyzer.

A benefit of the separate verification is that the type of the object is known with an improved confidence level, which increases the likelihood of selecting an appropriate operation on the gripped object.

In one embodiment of the invention, the exemplary embodiment described above is further improved by the present invention by utilizing at least one machine learning system at different steps of the operation.

In one embodiment of the invention, the operation of the system posits two learning problems, which relate to calculating various parameters from sensor data. This could be achieved using a set of predetermined calculations, but such system would be inflexible and specific to a set of operating conditions and hence likely not optimal for operation in an unstructured arena, the conditions of which can not by definition be known at the time the predetermined calculations would be defined.

In one embodiment of the invention, a first learning problem relates to determining from a data set received form the system a set of parameters for a gripping operation to be attempted.

In one embodiment of the invention, a second learning problem relates to determining the parameters for moving the robot arm to grip an object of interest.

The embodiments of the invention described hereinbefore regarding FIG. 2 may be used in any combination with each other. Several of the embodiments may be combined together to form a further embodiment of the invention. A method, a system, an apparatus, a computer program or a computer program product to which the invention is related may comprise at least one of the embodiments of the invention described hereinbefore.

Figure 3:
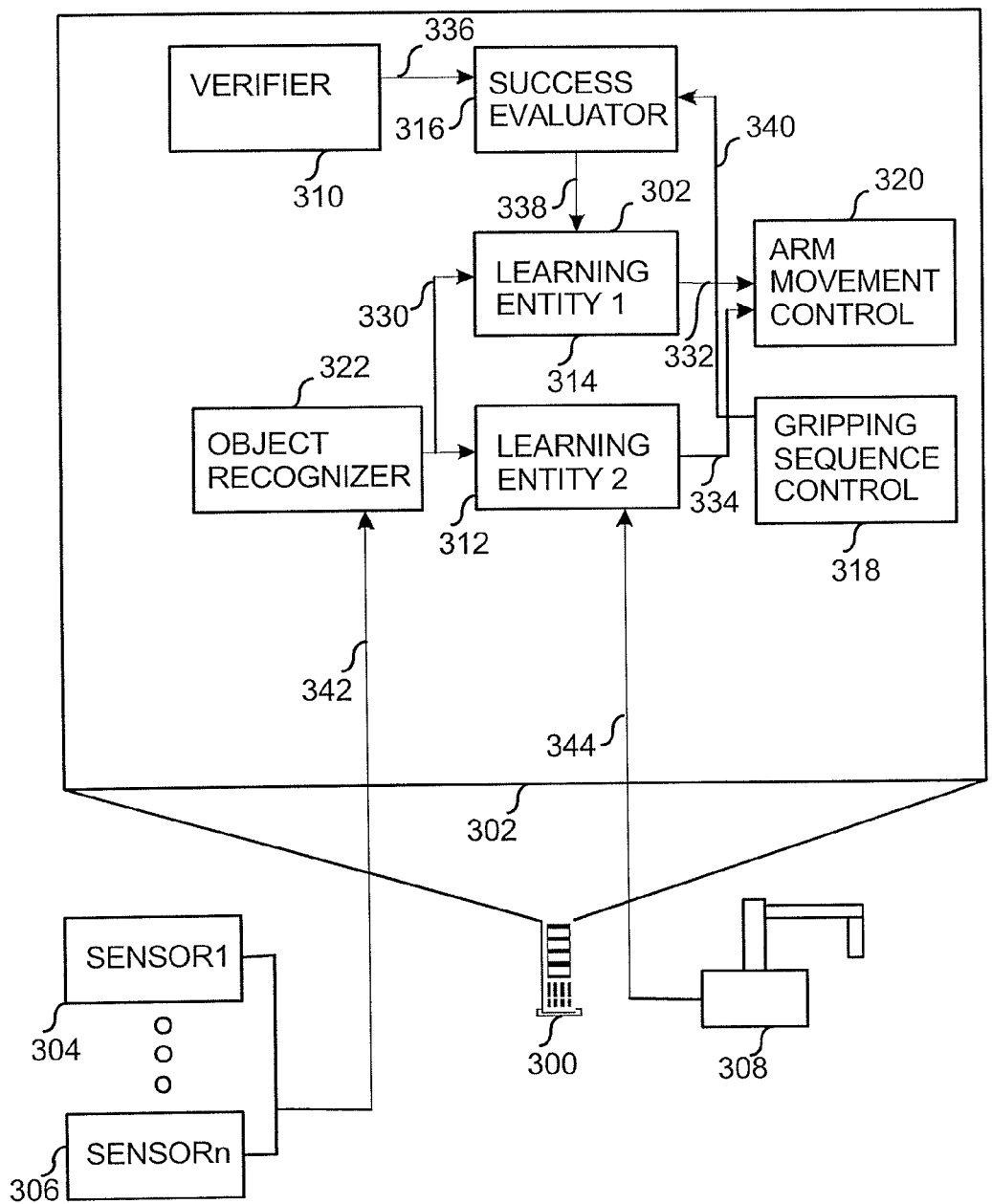
FIG. 3 is a block diagram illustrating a computer comprising two learning systems in one embodiment of the invention.

FIG. 3 is a block diagram illustrating a computer comprising two learning systems in one embodiment of the invention. In FIG. 3 there is show a computer 300, which comprises a random access memory, at least one processor and a secondary memory (not shown). The internal functions within computer 300 are illustrated with box 302. Computer 300 executes a first learning entity 314, a second learning entity 312, a verifier entity 310, an arm movement control entity 320, a gripping sequence control entity 318 and an object recognizer 322. First learning entity 314 and second learning entity 312 both are examples of a learning system. It should be understood that although the system in FIG. 3 is illustrated as comprising of separate parts labelled 310, 312, 314, 316, 318, 320 and 322, this division into these parts serves as an explanation of the present invention and the number of parts can be different depending on the method of implementation. The different parts can be implemented as the parts of a computer program executed on a single computer system. In this description the controlling unit is taken to include the parts in FIG. 3. In one embodiment of the invention, computer 300 corresponding to data processing apparatus 100 illustrated in FIG. 1.

First learning entity 314 takes as input features extracted from the sensor data obtained from a plurality of sensors such as a sensor 304 and a sensor 306. The features are extracted by an object recognizer entity 322 from sensor data illustrated with arrow 342. First learning entity 314 calculates a set of parameters 332 for arm movement control entity 320, using features illustrated with arrow 330 to be used for performing a gripping operation, the goal being that that the likelihood of a successful gripping operation using these parameters is relatively high. Such parameters can include, for example, the location of the target object or the orientation of the gripper before a gripping operation is attempted. An example of using first learning entity 314 for calculating the likely location of the object of interest in an unstructured arena is now given as an example of the operation of first learning entity 314. For brevity, the example only presents the calculation of the likely location (x,y) and the invention is not restricted to this.

The coordinates (x,y) received by first learning entity 314 from object recognizer entity 322 correspond to the location of a recognised object in the coordinate system of a camera. The camera is preferably fixed to the robot arm, so the camera image at any moment corresponds to the location and orientation of the robot arm. In order to grip the object, the robot arm needs to be moved to a location and orientation where the gripper is in a good position to grip the object, said position likely depending on the properties of the object, the gripper and other objects in the arena where the robot arm operates and other possible factors. First learning entity 314 is used to calculate, based on previous gripping attempts, a location in the image coordinate system from where a successful gripping operation is most likely.

First learning entity 314 takes as input data items 338 which comprise the parameters of previous attempts from a success evaluator entity 316, which determines success of gripping sequence information 340 obtained from gripping sequence control entity 318. In this example the data items 338 consist of coordinates (x,y) corresponding to a gripping attempt with the centroid of the recognised object at (x,y), and the corresponding evaluation of the gripping attempt at (x,y) regarding whether it was successful or failure. These data items are then used to calculate the output 332 of first learning entity 314. Output 332 from first learning entity 314 to arm movement control entity 320 is preferably not a single point but instead a distribution of points. Many regression or classification algorithms suitable for calculating the distribution are known from literature, for example, the maximum likelihood method or support vector machines can be used to achieve this. In this example, the output 332 could be, for example, a bivariate normal distribution parameterised by the centre $(x_0, y_0)$ and standard deviations $\sigma_x$ and $\sigma_x$ for both coordinates x and y, which are calculated using the well known maximum likelihood method.

Using the described learning system in learning entity 314 provides several benefits compared to simply using an object recognition system to determine the location of an object. As the output is not merely one point but a distribution, it is possible during the operation to either use the optimal point, which in this example would be the centre $(x_0, y_0)$ of the distribution, or to select different points from the distribution according to their likelihood. This allows the system to continuously learn by having data of new gripping attempts applied to the learning system and thus adapt to the conditions of the unstructured arena. Even if insufficient data of the operating environment was gathered before installing the system, the system can learn while in operation and new data can improve the results further. Another benefit is that if the conditions change, e.g. a collision deforms the gripper or moves the camera mount, and as a result the optimal gripping position relative to the object's position in the camera image changes, the system learns to compensate for these changes.

The arm movement control entity 320 then moves the robot arm to the determined gripping location. To move the robot arm towards an object, the difference of the object's location as determined by object recognizer entity 322 and the location of most likely successful gripping position determined by first learning entity 314 is calculated. This difference is then converted into a difference in physical world coordinates used to control the robot arm. The conversion cannot be assumed to be perfect, and thus the algorithm must compensate for it in real time during the approach. At each step, the location of the object in the image is computed as described above and compared to the most likely successful gripping position. The difference between the two, which is a vector of coordinates in the camera coordinate system, is converted into world coordinates by multiplying the coordinate vector by a conversion matrix M, and the robot arm is moved accordingly. In addition, a slight low-pass filter is preferably applied in the conversion phase to make the movement smoother. The effect of this algorithm is that even for a conversion matrix M which corresponds to only a roughly correct transformation between the coordinate systems, each step moves the robot arm closer to the intended position. The direction may not be exactly towards the object, and thus at the next step when a new location of the object is available, extracted by object recognizer entity 322 from the camera image corresponding to a new gripper position, the direction of the movement is changed. This results in a spiral shape for the approach path, which will eventually converge so that the object's location as seen by the camera coincides with the most likely gripping position.

Second learning entity 312 is used to determine a more efficient way of moving the robot arm to a determined gripping location. Second learning entity 312 receives information on position of the robot arm and/or the gripper from the robot arm 308, as illustrated with arrow 344. Second learning entity 312 also takes as its input data on past gripping sequences. To illustrate the operation of the second learning system, a simple example with only the coordinates (x,y) is now given, which corresponds to the previous example. In this example, the data applied to the second learning system comprises a difference $(x_c, y_c)$, in camera coordinates, between the location of the object and the most likely gripping position at the beginning of a gripping sequence, and the difference $(x_d, y_d)$ between the world coordinates of the robot arm at the beginning of the gripping sequence and after the gripping sequence has been terminated.

As its output 334 to gripping sequence control entity 318, second learning entity 312 calculates a conversion matrix ML such that when ML is multiplied by a vector $(x_c, y_c, 1)$, a good approximation of the corresponding difference $(x_d, y_d)$ is obtained. ML can be calculated from the past gripping attempt data using e.g. a method known in literature as ridge regression, but other suitable methods are equally possible within the scope of the invention. It should also be noted that although the calculation in this example involves only coordinates in two-dimensional space, the described method is equally applicable to more complicated movements of the robot arm, for example movement including a third dimension in space or rotations of different parts of the robot arm.

Using second learning entity 312 is beneficial as the output matrix ML can be used to shortcut the movement algorithm of the robot arm by using it as the matrix M to calculate the target for the robot arm movement in one movement, and after that correcting the remaining error with the movement algorithm described before.

After the robot arm has been moved, a gripping operation is performed, and the evaluation step is performed to determine if the gripping was successful. If the evaluation result indicates that the gripping did not succeed, the execution returns to moving the arm to another location. If the result indicates a success, the type of the object is verified by verifier entity 310, as illustrated with arrow 336.

When at least one processor executes functional entities associated with the invention, a memory comprises entities such as success evaluator entity 316, learning system entity 314, learning system entity 312, verifier entity 310, arm movement control entity 320 and gripping sequence control 318. The functional entities within computer 300 illustrated in FIG. 3 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optic disk. Some functional entities may be implemented as program modules linked to another functional entity. The functional entities in FIG. 3 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   receiving first sensor data from at least one first sensor, wherein the first sensor is a digital camera oriented to view an arena;
   determining a target position from the first sensor data, said target position comprising at least one of a position in space and an orientation for a gripper in association with a robot arm;
   starting to issue at least one first instruction to at least one of the robot arm and the gripper in order to move the gripper to the target position;
   receiving feedback sensor data from at least one force feedback sensor, associated with at least one of the robot arm and the gripper, to determine a failure in carrying out the at least one first instruction;
   receiving second sensor data from the at least one first sensor;
   determining a successful gripping of an object from the second sensor data;
   receiving verification sensor data from at least one second sensor, in response to the determining of the successful gripping;
   issuing at least one second instruction to the robot arm in order to move the arm to a predetermined position to release the grip of the gripper;
   registering the successful gripping and the first sensor data to a first computer program stored in a non-transitory computer readable medium;
   registering an unsuccessful gripping and the first sensor data to the first computer program, in response to a determined failure in carrying out the at least one first instruction;
   predicting a likelihood for the successful gripping of a next object from new first sensor data using the information registered in the first computer program; and
   issuing at least one new first instruction to at least one of the robot arm and the gripper, to grip the next object, based on the predicted likelihood.

2. The method according to claim 1, the method further comprising:
   issuing at least one third instruction to the robot arm to move the gripper to a verification position.

3. The method according to claim 2, wherein the verification position corresponds to a verification environment where the at least one second sensor is provided the second sensor data regarding the object without interfering objects.

4. The method according to claim 3, wherein the verification environment has a constant background, which does not change with time.

5. The method according to claim 2, the method further comprising:
determining a type of the object from the verification sensor data from the at least one second sensor.

6. The method according to claim 1, wherein the starting to issue the at least one first instruction further comprises:
providing a first coordinates instruction to the robot arm;
receiving first intermediate sensor data from the at least one first sensor; and
determining an actual position of the gripper in a sensor coordinate system using the first intermediate sensor data.

7. The method according to claim 6, wherein the starting to issue the at least one first instruction further comprises:
determining an error between the actual position of the gripper and the first coordinates instruction;
providing a second coordinates instruction to the robot arm;
receiving second intermediate sensor data from the at least one first sensor;
determining a second actual position of the gripper in the sensor coordinate system using the second intermediate sensor data; and
checking whether the error is smaller than a predetermined threshold.

8. The method according to claim 6, wherein the starting to issue the at least one first instruction further comprises:
registering connection information between coordinates of the robot arm and the position of the gripper as determined in the sensor coordinate system in a second computer program stored in the non-transitory computer readable medium.

9. The method according to claim 8, wherein the starting to issue the at least one first instruction further comprises:
constructing a conversion function between coordinates of the robot arm and coordinates in the sensor coordinates system, using the registered connection information.

10. The method according to claim 9, wherein the determining a target position from the first sensor data further comprises:
determining an initial target position in the sensor coordinate system; and
computing the target position from the initial target position using the conversion function.

11. An apparatus comprising at least one processor and at least one memory including computer program code, the at least one memory and the computer program code configured to, with the at least one processor, cause the apparatus at least to perform:
receiving first sensor data from at least one first sensor, wherein the first sensor is a digital camera oriented to view an arena;
determining a target position from the first sensor data, said target position comprising at least one of a position in space and an orientation for a gripper in association with a robot arm;
starting to issue at least one first instruction to at least one of the robot arm and the gripper in order to move the gripper to the target position;
receiving force feedback sensor data from at least one force feedback sensor, associated with at least one of the robot arm and the gripper, to determine a failure in carrying out the at least one first instruction;
receiving second sensor data from the at least one first sensor;
determining a successful gripping of an object from the second sensor data;
receiving verification sensor data from at least one second sensor, in response to the determining of the successful gripping;
issuing at least one second instruction to the robot arm in order to move the arm to a predetermined position to release the grip of the gripper;
registering the successful gripping and the first sensor data to a first computer program stored in a non-transitory computer readable medium;
registering an unsuccessful gripping and the first sensor data to the first computer program, in response to a determined failure in carrying out the at least one first instruction;
predicting a likelihood for the successful gripping of a next object from new first sensor data using the information registered in the first computer program; and
issuing at least one new first instruction to at least one of the robot arm and the gripper, to grip the next object, based on the predicted likelihood.

12. An apparatus, comprising:
means for receiving first sensor data from at least one first sensor, wherein the first sensor is a digital camera oriented to view an arena;
means for determining a target position from the first sensor data, said target position comprising at least one of a position in space and an orientation for a gripper in association with a robot arm;
means for starting to issue at least one first instruction to at least one of the robot arm and the gripper in order to move the gripper to the target position;
means for receiving force feedback sensor data from at least one force feedback sensor, associated with at least one of the robot arm and the gripper, to determine a failure in carrying out the at least one first instruction;
means for receiving second sensor data from the at least one first sensor;
means for determining a successful gripping of an object from the second sensor data;
means for receiving verification sensor data from at least one second sensor, in response to the determining of the successful gripping;
means for issuing at least one second instruction to the robot arm in order to move the arm to a predetermined position to release the grip of the gripper;
means for registering the successful gripping and the first sensor data to a first computer program stored in a non-transitory computer readable medium;
means for registering an unsuccessful gripping and the first sensor data to the first computer program, in response to a determined failure in carrying out the at least one first instruction;
means for predicting a likelihood for the successful gripping of a next object from new first sensor data using the information registered in the first computer program; and
means for issuing at least one new first instruction to at least one of the robot arm and the gripper, to grip the next object, based on the predicted likelihood.

13. A non-transitory computer readable medium storing a computer program, the computer program comprising code for controlling a processor to execute a method comprising:
receiving first sensor data from at least one first sensor;

determining a target position from the first sensor data, said target position comprising at least one of a position in space and an orientation for a gripper in association with a robot arm;

starting to issue at least one first instruction to at least one of the robot arm and the gripper in order to move the gripper to the target position;

receiving force feedback sensor data from at least one of at least one force feedback sensor, associated with at least one of the robot arm and the gripper, and the at least one first sensor, to determine a failure in carrying out the at least one first instruction;

receiving second sensor data from the at least one first sensor;

determining a successful gripping of an object from the second sensor data;

receiving verification sensor data from at least one second sensor, in response to the determining of the successful gripping;

issuing at least one second instruction to the robot arm in order to move the arm to a predetermined position to release the grip of the gripper;

registering the successful gripping and the first sensor data to a first computer program stored in a non-transitory computer readable medium;

registering an unsuccessful gripping and the first sensor data to the first computer program, in response to a determined failure in carrying out the at least one first instruction;

predicting a likelihood for the successful gripping of a next object from new first sensor data using the information registered in the first computer program; and issuing at least one new first instruction to at least one of the robot arm and the gripper, to grip the next object, based on the predicted likelihood.

14. The non-transitory computer readable medium according to claim 13, wherein said computer readable medium is a removable memory card, a holographic memory, a magnetic disk or an optical disk.

\* \* \* \* \*